(12) United States Patent
Morigasaki et al.

(10) Patent No.: US 9,156,739 B2
(45) Date of Patent: Oct. 13, 2015

(54) DIELECTRIC CERAMIC COMPOSITION AND AN ELECTRONIC DEVICE THEREOF

(71) Applicant: TDK Corporation, Minato-ku, Tokyo (JP)

(72) Inventors: Nobuto Morigasaki, Tokyo (JP); Takashi Sasaki, Tokyo (JP); Tomohisa Fukuoka, Tokyo (JP); Yuhta Matsunaga, Tokyo (JP); Kazuhiro Komatsu, Tokyo (JP)

(73) Assignee: TDK CORPORATION, Tokyo (JP)

( * ) Notice: Subject to any disclaimer, the term of this patent is extended or adjusted under 35 U.S.C. 154(b) by 81 days.

(21) Appl. No.: 14/188,478

(22) Filed: Feb. 24, 2014

(65) Prior Publication Data
US 2014/0240896 A1 Aug. 28, 2014

(30) Foreign Application Priority Data
Feb. 25, 2013 (JP) ................. 2013-035141

(51) Int. Cl.
| | | |
|---|---|---|
| C04B 35/00 | (2006.01) | |
| H01G 4/06 | (2006.01) | |
| C04B 35/468 | (2006.01) | |
| H01G 4/30 | (2006.01) | |
| H01G 4/12 | (2006.01) | |

(52) U.S. Cl.
CPC .......... *C04B 35/4682* (2013.01); *H01G 4/1227* (2013.01); *H01G 4/30* (2013.01); *C04B 2235/3206* (2013.01); *C04B 2235/3224* (2013.01); *C04B 2235/3236* (2013.01); *C04B 2235/3239* (2013.01); *C04B 2235/3241* (2013.01); *C04B 2235/3256* (2013.01);

(Continued)

(58) Field of Classification Search
CPC ..... H01G 4/12; H01G 4/1209; H01G 4/1218; H01G 4/1227; H01G 4/1236; H01G 4/1245; C04B 35/46; C04B 35/462; C04B 35/465; C04B 35/468; C04B 35/4682; C04B 35/4686; C04B 35/47; C04B 35/48; C04B 35/491
USPC ................ 501/134, 135, 136, 137, 139, 138; 361/321.4, 321.1, 321.2, 311, 312, 361/313, 301.2, 306.1, 306.3, 309
See application file for complete search history.

(56) References Cited

U.S. PATENT DOCUMENTS 6,243,254 B1 * 6/2001 Wada et al. ................... 361/311
6,245,433 B1 * 6/2001 Nakamura et al. ............ 428/469

(Continued)

FOREIGN PATENT DOCUMENTS

| JP | 10-223471 A | 8/1995 |
|---|---|---|
| JP | 2000-154057 A | 6/2000 |

(Continued)

*Primary Examiner* — Noah Wiese
(74) *Attorney, Agent, or Firm* — Arent Fox LLP (57) ABSTRACT

A multilayer ceramic composition showing good characteristics, even when electric intensity on dielectric layers is high and a stacked number of a multilayer ceramic capacitor is increased, and an electronic device thereof. Said composition comprises: a perovskite compound $ABO_3$, and with respect to 100 moles of said compound, 0.6 or more to 1.4 or less moles of $Ra_2O_3$ in which Ra is at least one of Dy, Gd and Tb, 0.2 or more to 0.7 or less moles of $Rb_2O_3$ in which Rb is at least one of Ho and Y, and 0.2 or more to 0.7 or less moles of $Rc_2O_3$ in which Rc is at least one of Yb and Lu, in terms of each oxide, 0.6 or more to 1.6 or less moles of Mg oxide in terms of Mg, and 0.6 or more to less than 1.2 moles of Si included compound in terms of Si.

12 Claims, 2 Drawing Sheets

(52) U.S. Cl.
CPC . *C04B2235/3258* (2013.01); *C04B 2235/3262* (2013.01); *C04B 2235/3418* (2013.01); *C04B 2235/5445* (2013.01); *C04B 2235/6562* (2013.01); *C04B 2235/6565* (2013.01); *C04B 2235/6584* (2013.01); *C04B 2235/664* (2013.01); *C04B 2235/785* (2013.01); *C04B 2235/79* (2013.01); *H01G 4/1236* (2013.01); *Y10T 428/2982* (2015.01)

(56) References Cited

U.S. PATENT DOCUMENTS

| | | | |
|---|---|---|---|
| 6,559,084 B1 * | 5/2003 | Fujikawa et al. | 501/139 |
| 6,917,513 B1 * | 7/2005 | Kim et al. | 361/321.2 |
| 8,363,383 B2 * | 1/2013 | Sato et al. | 361/321.2 |
| 8,492,302 B2 * | 7/2013 | Takano et al. | 501/139 |
| 8,673,799 B2 * | 3/2014 | Sato et al. | 501/139 |
| 2011/0286146 A1 * | 11/2011 | Sato et al. | 361/321.5 |
| 2012/0063056 A1 * | 3/2012 | Takano et al. | 361/321.5 |

FOREIGN PATENT DOCUMENTS

| | | |
|---|---|---|
| JP | 2003-277139 A | 10/2003 |
| JP | 2007-217205 A | 8/2007 |
| JP | 2011-201761 A | 10/2011 |
| JP | 2011-241129 A | 12/2011 |
| JP | 2013-43819 A | 3/2013 |

* cited by examiner

DIELECTRIC CERAMIC COMPOSITION AND AN ELECTRONIC DEVICE THEREOF

CROSS REFERENCE TO RELATED APPLICATIONS

This application is based upon and claims the benefit of priority of the prior Japanese Patent Application No. 2013-035141, filed Feb. 25, 2013, the entire contents of which are incorporated herein by reference.

TECHNICAL FIELD

The present invention relates to a dielectric ceramic composition and to a ceramic electronic device comprising a dielectric layer composed of said dielectric ceramic composition.

BACKGROUND

The multilayer ceramic capacitor as an example of a ceramic electronic device is widely used as a size-reduced electronic device showing a high performance and a high reliability. Large numbers are used for an electric equipment or an electronic equipment. In recent years, as the electric equipment and the electronic equipment are size-reduced or show higher performance, further reduction in size, higher performance and further improvement in reliability are requested. The multilayer ceramic capacitors in Japanese Unexamined Patent Publication No. H10-223471 and in Japanese Unexamined Patent Publication No. 2011-201761 are described as multilayer ceramic capacitors which respond to such requests.

However, in recent years, further reduction in size and higher performance of the multilayer ceramic capacitor are requested; and thus, thin and multilayer of dielectric layers are essential.

Therefore, a demand for a dielectric ceramic composition which can provide an efficient reliability and a good temperature characteristic even with said thin and multilayer of dielectric layers, is increasing.

SUMMARY OF THE INVENTION

The present invention has been made by considering the above circumstances, and a purpose of the present invention is to provide a multilayer ceramic composition and an electronic device which can provide a good temperature characteristic and an efficient reliability even when dielectric layers are made thinner than conventional layers leading to higher electric intensity on said dielectric layers or when a number of dielectric layers are increased.

In order to achieve the above purpose, a dielectric ceramic composition according to the present invention comprises; a main component of a compound having a perovskite crystalline structure expressed by a general formula $ABO_3$ ("A" is at least one selected from Ba, Ca and Sr, and "B" is at least one selected from Ti and Zr), and subcomponents, with respect to 100 moles of the main component, comprising 0.6 to 1.4 moles of Ra oxide (Ra is at least one selected from a group consisting of Dy, Gd and Tb) in terms of $Ra_2O_3$, 0.2 to 0.7 moles of Rb oxide (Rb is at least one selected from a group consisting of Ho and Y) in terms of $Rb_2O_3$, 0.2 to 0.7 moles of Rc oxide (Rc is at least one selected from a group consisting of Yb and Lu) in terms of $Rc_2O_3$, 0.6 to 1.2 moles of Mg oxide in terms of Mg, and 0.6 to 1.2 moles (1.2 moles is not included) of Si oxide in terms of Si.

Further, a total of said Ra, Rb and Rc is 1.5 moles or more and 2.4 moles or less in terms of $Ra_2O_3$, $Rb_2O_3$ and $Rc_2O_3$ respectively. Mole ratios of Ra oxide, Mg oxide and Si oxide are all within a plane surrounded by 4 points; point A (28, 34, 38), point B (37, 27, 37), point C (41, 35, 24) and point D (27, 46, 27).

As the subcomponent, it is preferable to further comprise 0.05 to 0.10 moles of an oxide of at least one selected from a group consisting of V, Mo and, W in terms of V, Mo and W respectively.

As the subcomponent, it is preferable to further comprise 0.10 to 0.20 moles of Mn oxide and/or Cr oxide in terms of Mn and/or Cr.

In addition, an average particle diameter of a dielectric ceramic composition of the present invention is preferably 150 to 260 nm. It is further preferable that Ba/Ti=1.004 to 1.015.

A ceramic electronic device according to the present invention comprises a dielectric layer, composed of the above dielectric ceramic composition, and an electrode layer.

DESCRIPTION OF EMBODIMENTS

Figure 1:
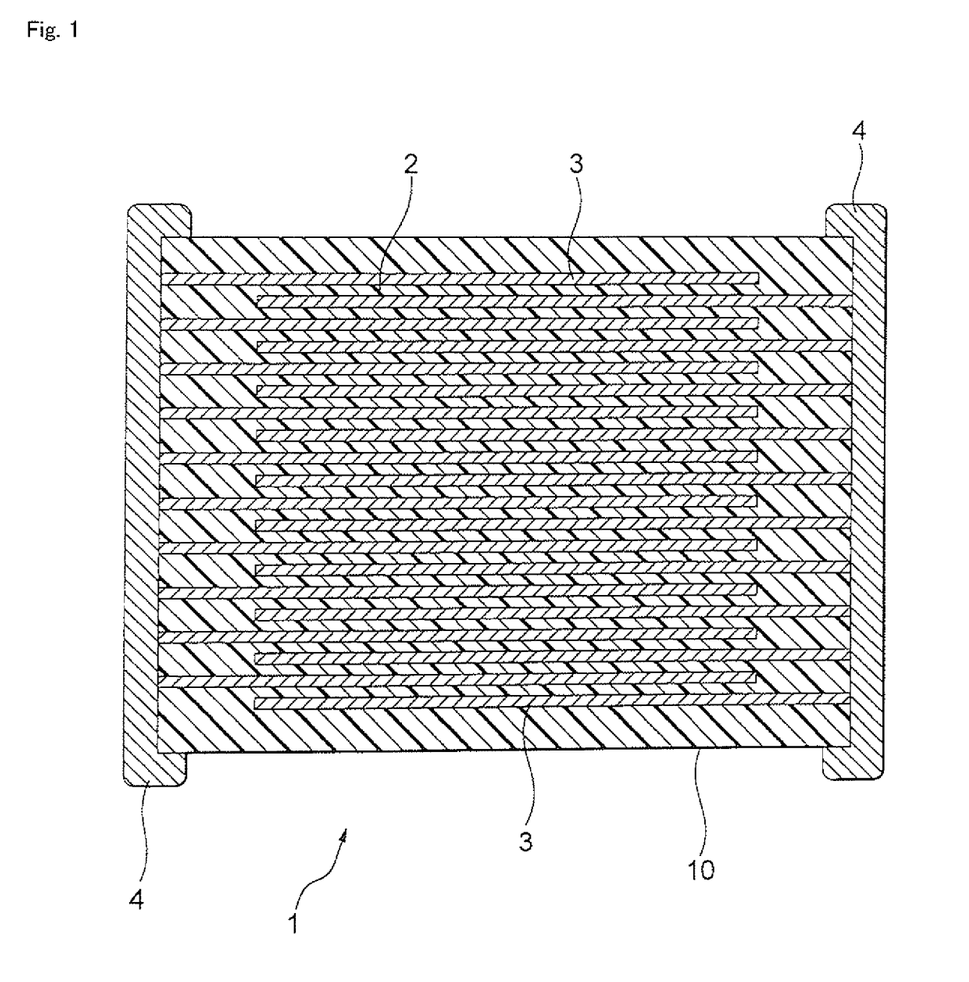
FIG. 1 is a cross-sectional view of a multilayer ceramic capacitor according to an embodiment of the present invention.

As is shown in FIG. 1, multilayer ceramic capacitor 1, as an example of the electronic device, has a capacitor element body 10 in which dielectric layers 2 and internal electrode layers 3 are alternately stacked. The internal electrode layers 3 are stacked so that their end surfaces are alternately exposed to facing surfaces of two end portions of the capacitor element body 10. A pair of external electrodes 4 are formed on both end portions of the capacitor element body 10, and are connected to exposed end surfaces of internal electrode layers 3 that are alternately stacked, so as to configure a capacitor circuit.

Although a formation of capacitor element body 10 is not particularly limited; it is normally a rectangular parallelpiped form as shown in FIG. 1. A size thereof is also not particularly limited.

Dielectric layer 2 is composed a dielectric ceramic composition of the present embodiment. The dielectric ceramic composition of the present embodiment comprises a compound expressed by a general formula $ABO_3$ ("A" is at least one selected from Ba, Ca and Sr, and "B" is at least one selected from Ti and Zr) as a main component. Further, the dielectric ceramic composition comprises dielectric particles, in which $ABO_3$ is a main component.

A compound expressed by $\{(Ba_{1-x-y}Ca_xSr_y)O\}_u(Ti_{1-z}Zr_z)vO_2$ is exemplified as an example of a compound expressed by a general formula $ABO_3$. Although all the ranges of "u", "v", "x", "y" and "z" are arbitrary, they are preferably within the below ranges.

In the above formula, "x" is preferably $0 \leq x \leq 0.1$, more preferably $0 \leq x \leq 0.05$. By setting "x" within the above range, a temperature characteristic, a specific permittivity, etc. of the dielectric layer composed of the dielectric ceramic composition according to the present invention can be controlled to be within the preferable ranges. A specific permittivity of the dielectric layer tends to be excessively low when "x" is too large. Further, Ca is not necessarily be included in the present embodiment. Namely, "x" can be zero.

In the above formula, "y" is preferably $0 \leq y \leq 0.1$, more preferably $0 \leq y \leq 0.05$. By setting "y" within the above range, a specific permittivity of the dielectric layer composed of the dielectric ceramic composition according to the present invention can be improved. A temperature characteristic of the dielectric layers tends to be deteriorated when "y" is too large. Further, Sr is not necessarily be included in the present embodiment. Namely, "y" can be zero.

In the above formula, "z" is preferably $0 \leq z \leq 0.3$, more preferably $0 \leq z \leq 0.15$. By setting "z" within the above range, a specific permittivity of the dielectric layer composed of the dielectric ceramic composition according to the present invention can be improved. A temperature characteristic of the dielectric layers tends to be deteriorated when "z" is too large. Further, Zr is not necessarily be included in the present embodiment. Namely, "z" can be zero.

In addition, a ratio of Ba and Ti included in the dielectric ceramic composition is preferably Ba/Ti=1.004 to 1.015, more preferably 1.007 to 1.012. In case when Ba/Ti is excessively high, a sintering appear to be insufficient, which becomes in a tendency to a decrease of the specific permittivity and also of the reliability. In case when Ba/Ti is excessively low, a firing stability and a temperature characteristic tend to be deteriorated.

Dielectric ceramic composition according to the present embodiment comprises, subcomponents of Ra oxide, Rb oxide, Rc oxide, Mg oxide and Si oxide, in addition to the above main component. Said Ra is at least one selected from a group consisting of Dy, Gd and Tb. Said Rb is at least one selected from a group consisting of Ho and Y. Said Rc is at least one selected from a group consisting of Yb and Lu.

Assuming that "α" is a content of Ra oxide with respect to 100 moles of $ABO_3$, "α" is 0.6 moles or more to 1.4 moles or less, and preferably 0.7 moles or more to 1.2 moles or less, in terms of $Ra_2O_3$. In case when "α" is excessively large, specific permittivity tends to decrease and a temperature characteristic tends to deteriorate. While when excessively small, a highly accelerated life time of dielectric layers tends to deteriorate. In addition, it is particularly preferable to include Dy as Ra.

Assuming that "β" is a content of Rb oxide with respect to 100 moles of $ABO_3$, "β" is 0.2 moles or more to 0.7 moles or less, and preferably 0.2 moles or more to 0.6 moles or less, in terms of $Rb_2O_3$. In case when "β" is excessively large, specific permittivity of the dielectric layer tends to decrease and a highly accelerated life time tends to deteriorate. While when excessively small, a temperature characteristic of dielectric layers tends to deteriorate. In addition, it is particularly preferable to include Ho as Rb.

Assuming that "γ" is a content of Rc oxide with respect to 100 moles of $ABO_3$, "γ" is 0.2 moles or more to 0.7 moles or less, and preferably 0.2 moles or more to 0.5 moles or less, in terms of $Rc_2O_3$. In case when "γ" is excessively large, a specific permittivity of dielectric layers tends to decrease and a highly accelerated life time tends to deteriorate. While when excessively small, a temperature characteristic of dielectric layers tends to deteriorate. In addition, it is particularly preferable to include Yb as Rc.

In addition, a total amount RT of "α", "β" and "γ" is preferably 1.5 moles or more to 2.4 moles or less, more preferably 1.5 moles or more to 2.0 moles or less, in terms of $Ra_2O_3$, $Rb_2O_3$ and $Rc_2O_3$. In case when RT is excessively large, Ra, Rb, and Rc segregate in dielectric layers and a highly accelerated life time tends to deteriorate. While when excessively small, a temperature characteristic of dielectric layers tends to deteriorate.

In the present embodiment, a metal element of the subcomponent, such as Ra, Rb, and Rc, is solid-dissolved in dielectric particles including $ABO_3$ as a main component. Although dielectric particles are preferable to show a core-shell structure, a complete solid-dissolved particles may be included.

In the present embodiment, a particular rare-earth elements are classified into Ra, Rb and Rc. This classification is based on an effective ionic radius value when said rare-earth elements are hexacoordinated. Considering the effective ionic radius value, there is a tendency that the rare-earth elements having a small difference with A-site atom can easily substitute (solid-dissolve) the A-site; while the rare-earth elements having a large difference with A-site atom are difficult to substitute (solid-dissolve) the A-site.

According to the present embodiment, rare-earth elements having the effective ionic radius which has small difference with the effective ionic radius of A-site atom are determined Ra; rare-earth elements having the effective ionic radius which has large difference with the effective ionic radius of A-site atom are determined Rc. Solid-dissolving degrees of Ra and Rc into $ABO_3$ are different. Ra tends to be completely solid-dissolved in $ABO_3$. Rc tends to be solid-dissolved at only a peripheral part of $ABO_3$, and tends to form a core-shell structure. As a result, when Ra is added to a dielectric ceramic composition, a highly accelerated life time of the dielectric ceramic composition is increased, while a temperature characteristic tends to deteriorate. In addition, a difference between ionic radius of Rb and the same of A site atom is approximately in the middle of an ionic radius difference between Ra and A site atom and an ionic radius difference between Rc and A site atom.

In the present embodiment, an adjustment of the group, consisting of 3 kinds of rare-earth elements: Ra, Rb and Rc, solid-solubilities of said Ra, Rb and Rc are controlled, and a good temperature characteristic as well as an excellent highly accelerated life time can be realized.

In addition, in the present embodiment, Mg oxide is further included in the dielectric ceramic composition. Content of Mg oxide is 0.6 to 1.2 moles, preferably 0.7 to 1.1 moles in terms of MgO with respect to 100 moles of $ABO_3$. In case when Mg oxide is excessively large, a highly accelerated life time of dielectric layer tends to deteriorate. While when excessively small, an abnormal particle growth of dielectric particles may be caused, and temperature characteristic of dielectric layer tends to deteriorate.

Si oxide is further included in the dielectric ceramic composition according to the present embodiment. Si oxide content is 0.6 moles or more to less than 1.2 moles and preferably 0.8 moles or more to 1.1 moles or less, in terms of Si and with respect to 100 moles of $ABO_3$. In case when Si oxide is excessively large, a highly accelerated life time and a temperature characteristic of the dielectric layer tend to deteriorate. While when Si oxide is excessively small, a highly accelerated life time and CR product tend to deteriorate. Note, in the present embodiment, a composite oxide is included in the oxide.

Considering above, according to the present embodiment, by controlling the total amount of the rare-earth elements Ra, Rb and Rc to be 1.5 moles or more to 2.4 moles or less with respect to 100 moles of $ABO_3$, specific permittivity improves and an interlaminar thickness of the dielectric layer can be set thick, which prolongs a lifetime of a ceramic electronic device. In addition, by controlling ratios of Ra oxide, Rb oxide, Rc oxide, Mg oxide and Si oxide, the lifetime can be further prolonged while maintaining a desired capacitance-temperature characteristic.

The dielectric ceramic composition according to the present embodiment is preferable to further include an oxide of at least one selected from a group consisting of V, Mo and W and Mn oxide and/or Cr oxide as subcomponents. With the inclusion of said components, characteristics can be further improved. Mn is preferable than Cr in the present embodiment in view of reliability.

A content of an oxide of at least one selected from a group consisting of V, Mo and W is preferably 0.03 moles or more and 0.10 moles or less and more preferably 0.05 moles or more to 0.09 moles or less in terms of V, Mo and W with respect to 100 moles of $ABO_3$. In case when a content of the oxide is excessively large, an insulation resistance (CR product) tends to decrease. In addition, "V" is preferably used in the present embodiment.

In addition, a content of Mn oxide and/or Cr oxide is preferably 0.10 moles or more and 0.20 moles or less, in terms of Mn and/or Cr with respect to 100 moles of $ABO_3$. In case when a content of Mn and/or Cr oxide is excessively large or excessively small, an insulation resistance (CR product) tends to decrease.

Although an average crystal particle diameter of dielectric particles included in the dielectric ceramic composition of the present embodiment after sintering is not particularly limited, it is preferably 150 to 260 nm and more preferably 170 to 250 nm in order to meet the requirement to obtain a thin dielectric layer. In case when the average crystal particle diameter is small, specific permittivity tends to decrease and a temperature characteristic tends to deteriorate. While in case when the average crystal particle diameter is large, a highly accelerated life time tends to deteriorate. In addition, the dielectric ceramic composition according to the present embodiment may further include the other components according to the desired characteristics.

Although a thickness of the dielectric layer of the present embodiment is not particularly limited, it is preferably 1.0 μm or more and 10.0 μm or less.

Although a number of stacked layers of the dielectric layers is not particularly limited, it is preferably 20 or more, more preferably 50 or more and the most preferably 100 or more. Although an upper limit of the stacked number is not particularly limited, it is e.g. 2,000 or so.

Although a conducting material included in the internal electrode layer is not particularly limited, relatively inexpensive base metals can be used since materials constituting the dielectric layer have a resistance to reduction. Ni or Ni alloy is preferable for the base metals used for the conducting material. As for Ni alloy, an alloy of Ni and one or more element selected from Mn, Cr, Co and Al is preferable; and Ni content in the alloy is preferably 95 wt % or more. Note that, in Ni or Ni alloy, various kinds of minor components, such as P, may be included for approximately 0.1 wt % or less in total. Although a thickness of the internal electrode layer is suitably determined according to its use, it is not particularly limited; and it is generally around 0.1 to 3.0 μm and preferably around 0.5 to 2.0 μm.

Although a conducting material included in the external electrode is not particularly limited, inexpensive Ni, Cu or their alloys may be used in the present embodiment. Although a thickness of external electrode 4 can be suitably determined according to its use, it is around 10 to 50 μm in general.

A Manufacturing Method of a Multilayer Ceramic Capacitor 1

The multilayer ceramic capacitor 1 of the present embodiment is manufactured by, as is the same with conventional multilayer ceramic capacitors, preparing a green chip using a normal printing method or a sheet method with paste, firing the same, then printing or transferring external electrode thereon and firing the same. The manufacturing method will specifically be described hereinafter.

Firstly, a dielectric raw material (dielectric ceramic composition powders) is prepared and then made to a paste in order to prepare a paste (a dielectric layer paste) for forming a dielectric layer.

As for the dielectric raw material, a raw material of $ABO_3$ and a raw material of Ra, Rb and Rc oxides are prepared. As for said raw materials, oxides of the above-mentioned components, their mixtures and their composite oxides may be used. It is also possible to suitably select from a variety of compounds to become the above mentioned oxides or their composite oxides after firing, for example, carbonate, oxalate, nitrate, hydroxide, organic metallic compound, etc., and to mix thereof to use. Barium titanate shown as $BaTiO_3$ is preferably used as $ABO_3$.

In addition, in case when barium titanate shown as $Ba_uTivO_3$ is used as a raw material of $ABO_3$, u/v is preferably within a range of $1.000 \leq u/v \leq 1.005$.

The raw materials of $ABO_3$ can be manufactured by various methods such as a solid phase method or various liquid-phase methods including an oxalate method, a hydrothermal synthesis method, an alkoxide method, a sol-gel method, etc.

Content of each compound in the dielectric raw material is set to show the above-identified dielectric ceramic composition after firing. Before pasting, an average particle diameter of the dielectric raw material is generally 0.1 to 1 μm or so.

The dielectric layer paste may be either an organic paste, to which the dielectric raw material and an organic vehicle are kneaded, or a water-based paste, to which the dielectric raw material and a water-based vehicle are kneaded.

The organic vehicle is obtained by dissolving a binder in an organic solvent. The binder is not particularly limited and may be suitably selected from various kinds of normal binders such as ethyl cellulose, polyvinyl butyral, etc. The organic solvent is also not particularly limited and may be suitably selected from various kinds of organic solvent, such as terpineol, butyl carbitol, acetone, toluene, etc., according to a utilized method, such as a printing method or a sheet method.

The water-based vehicle is obtained by dissolving a water-soluble binder, dispersants, etc. in water. The water-soluble binder used for water-based vehicle is not particularly limited, and it can be suitably selected from various binders used for a general water-soluble binder, such as polyvinyl alcohol, cellulose, water-soluble acrylic resin, etc.

An internal electrode layer paste is prepared by kneading the conductive material, constituted by the above-mentioned various conductive metals and alloys, or various oxides, organic metal compounds, resinate, etc., which become the above-mentioned conductive materials after firing, and the above-mentioned organic vehicle. In addition, the internal electrode layer paste may include an inhibitor. Although said inhibitor is not particularly limited, it is preferable to have the same composition with the main component.

Outer electrode paste may be prepared by the same method with the above-mentioned internal electrode layer paste.

Content of the organic vehicle in each paste mentioned above is not particularly limited, and may be a normal content, for example, around 1 to 10 wt % of the binder or around 10 to 50 wt % of the solvent. Also, each paste may include additives selected from a variety of dispersants, plasticizers, dielectrics, insulator, etc., if needed. Their total content is preferably 10 wt % or less.

When printing method is used, the dielectric layer paste and the internal electrode layer paste are printed and stacked on a substrate, such as PET, cut to a predetermined form and then removed from the substrate to obtain a green chip.

Also, when the sheet method is used, a green sheet is formed with dielectric layer paste, the internal electrode layer paste is printed thereon and an internal electrode pattern is formed, and then, the results are stacked to obtain a green chip.

(Binder Removal Condition)

Although the binder removal condition is not particularly limited, a temperature rising rate is preferably 5 to 300° C./hour, a holding temperature is preferably 180 to 400° C. and a temperature holding time is preferably 0.5 to 48 hours. Further, the binder removal atmosphere is preferably air or a reduced atmosphere.

(Firing Condition)

Green chip is fired after the binder removal. Although firing condition is not particularly limited, a temperature rising rate is preferably 100 to 1000° C./hour. A holding temperature when firing is preferably 1300° C. or less, more preferably 1150 to 1280° C. A holding time when firing is preferably 0.5 to 20 hours, more preferably 1.0 to 15 hours. In case when the holding temperature is excessively law, it becomes insufficient to be dense; while when excessively high, it becomes easy to generate an electrode breakage due to an abnormal sintering of the internal electrode layer, a temperature characteristic deterioration due to a diffusion of internal electrode layer composition material, and a reduction of the dielectric ceramic composition.

Firing atmosphere is preferably a reduced atmosphere. An atmospheric gas is not particularly limited; and for instance, a humidified mixed gas of $N_2$ and $H_2$ can be used.

An oxygen partial pressure when firing can be suitably determined depending on a kind of conductive materials in the internal electrode layer paste. In case when base metals such as Ni or Ni alloys and the like are used as conductive materials, oxygen partial pressure in a firing atmosphere is preferably $10^{-14}$ to $10^{-10}$ MPa. In case when the oxygen partial pressure is excessively law, the conductive materials of the internal electrode layer may cause an abnormal sintering and the electrode breakage may occur; while when excessively high, the internal electrode layer tends to oxidize. Although the temperature falling rate is not particularly limited, it is preferably 50 to 1000° C./hour.

(Annealing Condition)

After firing in the reduced atmosphere, it is preferable to perform an annealing process to the capacitor element body. Said anneal is a process for re-oxidizing dielectric layer and thereby remarkably raises insulation resistance (IR) of the dielectric layers, which improves reliability (IR lifetime).

Although an atmosphere of anneal is not particularly limited, the oxygen partial pressure is preferably $10^{-9}$ to $10^{-5}$ MPa. In case when the oxygen partial pressure is excessively law, re-oxidizing of dielectric layer becomes difficult; while when excessively high, internal electrode layer tends to oxidize.

Although a holding temperature when annealing is not particularly limited; it is preferably 1100° C. or less, and more preferably 950 to 1090° C. In case when said holding temperature is excessively law, an oxidization of dielectric layer tends to become insufficient, and thereby lowers insulation resistance (IR) of the dielectric layers, which lowers reliability (IR lifetime). While when said holding temperature is excessively high, not only the internal electrode layers oxidize and a capacitance of the capacitor tends to decrease, but internal electrode layers react with dielectric layers, and thereby it becomes easy to deteriorate temperature characteristic of dielectric layers, to lower IR, and to lower IR lifetime. Note that annealing process can be consisted only from a temperature raising process and a temperature falling process. Namely, a temperature holding time may be zero. In this case, "a holding temperature" defines "a maximum temperature".

The annealing condition other than the above is as follows. A temperature holding time is preferably 0 to 20 hours, and more preferably 2 to 4 hours. A temperature falling rate is preferably 50 to 1000° C./hour and more preferably 100 to 600° C./hour. Although a reduced gas when annealing is not particularly limited, it is preferable to use a humidified $N_2$ gas.

In order to humidify $N_2$ gas, a mixed gas, etc. when processing the above removal binder treatment, firing and annealing, a wetter and the like may be used. In case when the wetter is used, a water temperature is preferably around 5 to 75° C.

The removal binder treatment, the firing and the annealing may be continuously performed; or may be independently performed.

EXAMPLES

Example 1

Firstly, $BaTiO_3$ powder (u/v=1.004) having an average particle diameter of 200 nm as a raw material powder of $ABO_3$, $Dy_2O_3$ powder as a raw material of Ra oxide, $Ho_2O_3$ powder as a raw material of Rb oxide and $Yb_2O_3$ powder as a raw material of Rc oxide were respectively prepared. In addition, $BaCO_3$ powder as a raw material of Ba oxide, MgO powder as a raw material of Mg oxide, $MnCO_3$ powder as a raw material of Mn oxide, $V_2O_5$ powder as a raw material of V oxide and $SiO_2$ powder as a sintering aid were respectively prepared.

Next, the prepared each raw material powders were weighed to the amounts shown in Table 1, wet mixed and pulverized thereof for 20 hours with ball mill, and dried thereof to obtain dielectric raw materials. In addition, $BaCO_3$ and $MnCO_3$ were included in the dielectric ceramic composition respectively as BaO and MnO. 0.6 moles % of $BaCO_3$ was added to make Ba/Ti ratio after sintering to show 1.010.

Next, the obtained 100 parts by weight of the obtained dielectric raw material, 10 parts by weight of polyvinyl butyral resin, 5 parts by weight of dioctyl phthalate (DOP) as a plasticizer, and 100 parts by weight of alcohol as a solvent were mixed by a ball-mill and were pasted to obtain a dielectric layer paste.

Further, in addition to above, 44.6 parts by weight of Ni particles, 52 parts by weight of terpineol, 3 parts by weight of ethyl cellulose and 0.4 parts by weight of benzotriazole were kneaded by a triple-roll, pasted thereof to manufacture an internal electrode layer paste.

The above obtained dielectric layer paste was used to form a 4.5 μm thick green sheet on a PET film after drying. Next, an electrode layer was printed thereon in a predetermined pattern by using the internal electrode layer paste, and then the sheet was removed from PET film manufacturing the green sheet having the electrode layer. A plural number of green sheets having the electrode layers were then stacked and adhered by pressure so as to obtain a green stacked body. The green stacked body was then cut to a predetermined size to obtain a green chip.

Next, processes of removing binder, firing and annealing were performed on the obtained green chip under the following conditions, and a multilayer ceramic fired body was obtained.

The binder removal process was performed under a temperature rising rate of 25° C./hour, a holding temperature of 235° C., a holding time of 8 hours, and an atmosphere of air.

Firing conditions were a temperature rising rate of 200° C./hour, a holding temperature of 1260° C., a holding time of 2 hours, and a temperature falling rate of 200° C./hour. In addition, an atmospheric gas was a humidified mixed gas of $N_2+H_2$ and an oxygen partial pressure of $10^{-12}$ MPa.

Annealing conditions were a temperature rising rate of 200° C./hour, a holding temperature of 1050° C., a holding time of 3 hours, a temperature falling rate of 200° C./hour, and an atmospheric gas of a humidified $N_2$ gas (an oxygen partial pressure: $10^{-7}$ MPa).

Note, a wetter was used to humidify the atmospheric gas when firing and annealing.

Next, after barrel polishing end faces of the obtained multilayer ceramic fired body, Cu paste as an external electrode was coated thereon, and then baking processing was performed in a reduced atmosphere to obtain samples of a multilayer ceramic capacitor as shown in FIG. 1. Size of the obtained capacitor samples were 3.2 mm×1.6 mm×0.7 mm, a thickness of an interlayer between dielectric layers was 3.0 μm, and a thickness of the inter electrode was 1.0 μm. Further, as a number of dielectric layers sandwiched by the internal electrodes increases, it is general that a reliability such as a highly accelerated life time and the like tend to decrease. Accordingly, a number of dielectric layers in the present examples was set to 100 in order to easily observe changes of a highly accelerated life time.

Specific permittivity, CR product, capacitance changing rate at 125° C., highly accelerated life time (HALT) and an average particle diameter of a sintered body of the obtained capacitor sample were respectively measured by the following methods.

(Specific Permittivity)

For each capacitor sample, specific permittivity $\in$s was measured at a reference temperature of 25° C. by digital LCR meter (4274A by YHP) under the conditions of frequency at 1 kHz and input signal level (measured voltage) at 1.0 Vrms. Heat treatment was performed to each capacitor sample at 150° C. for 1 hour, and then the specific permittivity $\in$s (no unit) was calculated from the capacitance after 24 hours. Higher specific permittivity is preferable, and 2,200 or more were determined "good" in the present examples. Results are shown in Table 1.

(CR Product)

For each capacitor sample, an insulation resistance (IR) was measured by an insulation resistance meter (R8340A by Advantest), after applying a direct voltage of 25V at 25° C. for 1 minute. CR product was obtained by multiplying the above obtained capacitance "C" (unit is μF) and insulation resistance IR (unit is MΩ). Higher CR product is preferable, and CR products of 500 or more were determined "good" and 1,000 or more were determined "particularly good" in the present examples. Results are shown in Table 1.

(Capacitance Changing Rate at 125° C. (a Temperature Characteristic))

For each capacitor sample, capacitances at −55° C. and 125° C. were respectively measured under the conditions of frequency at 1.0 kHz and input signal level (measured voltage) at 1.0 Vrms. Then changing rate (ΔC) of the capacitance to a capacitance at a reference temperature of 25° C. were respectively calculated. It was evaluated whether the changing rate satisfies X7R characteristic, which is a temperature characteristic of EIA standard. In the present examples, it was evaluated whether the capacitance changing rate ΔC is within ±15% at a high temperature (125° C.). In case when the capacitance changing rate is within ±15% at 125° C., the capacitance changing rate at −55° C. also satisfies X7R characteristic. Results are shown in Table 1.

(Highly Accelerated Life Time)

The capacitor sample was maintained in the state of applying direct voltage at 175° C. under electric field of 25 V/μm to measure lifetime, by which a highly accelerated life time (HALT) was evaluated. In the present examples, a time from the start of applying voltage to an insulation resistance drop by one digit was determined a lifetime. Further, the above evaluation was done to 20 capacitor samples and Weibull analyzed thereof, and then the calculated "mean time to failure (MTTF)" was determined an average lifetime of the samples. In the present examples, an average lifetime of 50 hours or more was determined "good", and 100 hours or more was determined "particularly good". Results are shown in Table 1.

(An Average Particle Diameter of a Sintered Body)

A measuring method of an average crystal particle diameter of the dielectric particles was obtained as following. At first, the obtained capacitor sample was cut in a plane perpendicular to the internal electrode, and the cut plane thereof was polished. A chemical etching was performed to the polished plane, observed thereof by a scanning electrode microscope (SEM), and then 1,000 particles were counted and calculated by assuming the dielectric particles to have sphere formations. The average particle diameter of the sintered body of example 1 was 210 nm.

TABLE 1

| Sample No. | BaTiO3 [mol] | Ra2O3 [mol] | Rb2O3 [mol] | Rc2O3 [mol] | MgO [mol] | SiO2 [mol] | MnO [mol] | V2O5 [mol] | RT [mol] | Ra/Mg/Si Ra | Mg | Si | Specific Permitivity [—] | CR Product [MΩμF] | Capacitance Changing Rate at 125° C. [%] | MTTF [h] |
|---|---|---|---|---|---|---|---|---|---|---|---|---|---|---|---|---|
| ✗1 | 100 | 0.3 | 0.4 | 0.3 | 0.8 | 0.8 | 0.15 | 0.08 | 1 | 16 | 42 | 42 | 2872 | 1877 | −12.8 | 27 |
| ✗2 | 100 | 0.5 | 0.4 | 0.3 | 0.8 | 0.8 | 0.15 | 0.08 | 1.2 | 24 | 38 | 38 | 2715 | 2018 | −13.2 | 38 |
| 3 | 100 | 0.6 | 0.4 | 0.3 | 0.9 | 0.9 | 0.15 | 0.08 | 1.3 | 25 | 38 | 38 | 2689 | 1976 | −13.9 | 51 |
| ◎4 | 100 | 0.8 | 0.4 | 0.3 | 1 | 1 | 0.15 | 0.08 | 1.5 | 29 | 36 | 36 | 2803 | 1933 | −14.3 | 102 |
| ◎5 | 100 | 1.1 | 0.4 | 0.3 | 1 | 1 | 0.15 | 0.08 | 1.8 | 35 | 32 | 32 | 2728 | 1885 | −14.1 | 158 |
| ✗6 | 100 | 1.2 | 0.4 | 0.4 | 0.8 | 1.5 | 0.16 | 0.03 | 2 | 33 | 22 | 44 | 2435 | 2637 | −15.9 | 44 |
| ✗7 | 100 | 1.2 | 0.4 | 0.4 | 0.8 | 1.2 | 0.16 | 0.03 | 2 | 38 | 25 | 38 | 2389 | 2478 | −14.6 | 48 |
| 8 | 100 | 1.2 | 0.4 | 0.4 | 0.8 | 1 | 0.16 | 0.03 | 2 | 40 | 27 | 33 | 2326 | 2232 | −13.8 | 65 |
| 9 | 100 | 1.4 | 0.4 | 0.3 | 1 | 1 | 0.15 | 0.08 | 2.1 | 41 | 29 | 29 | 2412 | 1701 | −14.8 | 89 |
| ✗10 | 100 | 1.5 | 0.4 | 0.3 | 1 | 1 | 0.15 | 0.08 | 2.2 | 43 | 29 | 29 | 2250 | 1634 | −16.4 | 97 |
| ✗12 | 100 | 1 | 0.1 | 0.3 | 1 | 1 | 0.15 | 0.08 | 1.4 | 33 | 33 | 33 | 2676 | 2058 | −15.8 | 88 |
| ◎13 | 100 | 1 | 0.2 | 0.3 | 1 | 1 | 0.15 | 0.08 | 1.5 | 33 | 33 | 33 | 2612 | 1948 | −14.9 | 101 |
| ◎14 | 100 | 1 | 0.4 | 0.3 | 1 | 1 | 0.15 | 0.08 | 1.7 | 33 | 33 | 33 | 2654 | 1856 | −13.5 | 135 |
| ◎15 | 100 | 1 | 0.7 | 0.3 | 1 | 1 | 0.15 | 0.08 | 2 | 33 | 33 | 33 | 2521 | 1744 | −12.9 | 111 |
| ✗16 | 100 | 1 | 0.8 | 0.3 | 1 | 1 | 0.15 | 0.08 | 2.1 | 33 | 33 | 33 | 2275 | 1672 | −12.2 | 32 |
| ✗17 | 100 | 0.9 | 0.4 | 0.1 | 1 | 1 | 0.15 | 0.08 | 1.4 | 31 | 34 | 34 | 2761 | 2121 | −16.3 | 74 |
| ◎18 | 100 | 0.9 | 0.4 | 0.2 | 1 | 1 | 0.15 | 0.08 | 1.5 | 31 | 34 | 34 | 2651 | 2213 | −15 | 121 |
| ◎19 | 100 | 0.9 | 0.4 | 0.4 | 1 | 1 | 0.15 | 0.08 | 1.7 | 31 | 34 | 34 | 2656 | 1985 | −13.8 | 163 |
| ◎20 | 100 | 0.9 | 0.4 | 0.7 | 1 | 1 | 0.15 | 0.08 | 2 | 31 | 34 | 34 | 2409 | 1852 | −12.5 | 109 |
| ✗21 | 100 | 0.9 | 0.4 | 0.8 | 1 | 1 | 0.15 | 0.08 | 2.1 | 31 | 34 | 34 | 2175 | 1731 | −11.4 | 29 |
| ◎22 | 100 | 1.3 | 0.6 | 0.5 | 1 | 1.1 | 0.15 | 0.08 | 2.4 | 38 | 29 | 32 | 2438 | 1765 | −13.4 | 119 |
| 23 | 100 | 1.3 | 0.7 | 0.5 | 1.1 | 1 | 0.15 | 0.08 | 2.5 | 38 | 32 | 29 | 2401 | 1733 | −12.9 | 89 |
| ✗24 | 100 | 0.9 | 0.4 | 0.4 | 0.5 | 1 | 0.15 | 0.08 | 1.7 | 38 | 21 | 42 | 2875 | 2105 | −16.9 | 46 |
| 25 | 100 | 0.9 | 0.4 | 0.4 | 0.6 | 0.9 | 0.15 | 0.08 | 1.7 | 38 | 25 | 38 | 2732 | 2089 | −15 | 95 |
| ◎26 | 100 | 0.9 | 0.4 | 0.4 | 1.2 | 1 | 0.15 | 0.08 | 1.7 | 29 | 39 | 32 | 2501 | 2121 | −14.3 | 123 |
| ◎27 | 100 | 0.9 | 0.4 | 0.4 | 1.1 | 0.7 | 0.15 | 0.08 | 1.5 | 33 | 41 | 28 | 2417 | 1321 | −12.9 | 104 |
| 28 | 100 | 0.9 | 0.4 | 0.4 | 1.6 | 1 | 0.15 | 0.08 | 1.7 | 26 | 46 | 29 | 2419 | 2053 | −14.5 | 75 |
| ✗29 | 100 | 0.9 | 0.4 | 0.4 | 1.7 | 1 | 0.15 | 0.08 | 1.7 | 25 | 47 | 28 | 2177 | 2111 | −14.2 | 44 |
| ✗30 | 100 | 0.9 | 0.4 | 0.4 | 2 | 0.6 | 0.15 | 0.08 | 1.7 | 26 | 57 | 17 | unmeasurable due to unsintering | | | |
| ✗31 | 100 | 1 | 0.4 | 0.4 | 1 | 0.3 | 0.15 | 0.08 | 1.8 | 43 | 43 | 13 | unmeasurable due to unsintering | | | |
| ✗32 | 100 | 0.9 | 0.4 | 0.4 | 1 | 0.5 | 0.15 | 0.08 | 1.7 | 38 | 42 | 21 | 2021 | 768 | −11.9 | 37 |
| 33 | 100 | 0.9 | 0.4 | 0.4 | 1 | 0.6 | 0.15 | 0.08 | 1.7 | 36 | 40 | 24 | 2419 | 1102 | −12.3 | 77 |
| ◎34 | 100 | 0.9 | 0.4 | 0.4 | 1 | 0.8 | 0.15 | 0.08 | 1.7 | 33 | 37 | 30 | 2578 | 2055 | −14.5 | 102 |
| ◎35 | 100 | 0.9 | 0.4 | 0.4 | 1 | 1.1 | 0.15 | 0.08 | 1.7 | 30 | 33 | 37 | 2644 | 2111 | −14.9 | 135 |
| ✗36 | 100 | 0.9 | 0.4 | 0.4 | 1 | 1.2 | 0.15 | 0.08 | 1.7 | 29 | 32 | 39 | 2721 | 2188 | −15.3 | 97 |
| ✗37 | 100 | 0.9 | 0.4 | 0.4 | 0.6 | 2 | 0.15 | 0.08 | 1.7 | 26 | 17 | 57 | 3021 | 3287 | −25.6 | 38 |
| 38 | 100 | 1 | 0.4 | 0.4 | 1.4 | 0.7 | 0.15 | 0.08 | 1.8 | 32 | 45 | 23 | 2456 | 1843 | −13.8 | 76 |
| 39 | 100 | 1.3 | 0.4 | 0.4 | 1.3 | 0.7 | 0.15 | 0.08 | 2.1 | 39 | 39 | 21 | 2421 | 1231 | −12.8 | 88 |
| 40 | 100 | 1.4 | 0.4 | 0.4 | 1.1 | 0.7 | 0.15 | 0.08 | 2.2 | 44 | 34 | 22 | 2409 | 1232 | −12.4 | 76 |
| ◎41 | 100 | 1.1 | 0.4 | 0.4 | 0.8 | 1.1 | 0.15 | 0.08 | 1.9 | 37 | 27 | 37 | 2664 | 1976 | −14.7 | 145 |
| ◎42 | 100 | 1.2 | 0.4 | 0.4 | 1.2 | 0.8 | 0.15 | 0.08 | 2 | 38 | 38 | 25 | 2579 | 1876 | −14.3 | 137 |
| ◎43 | 100 | 1.4 | 0.4 | 0.4 | 1.2 | 0.8 | 0.15 | 0.08 | 2.2 | 41 | 35 | 24 | 2445 | 1345 | −13.1 | 100 |
| ◎44 | 100 | 0.9 | 0.4 | 0.4 | 0.9 | 0.7 | 0.15 | 0.08 | 1.7 | 36 | 36 | 28 | 2731 | 1765 | −14.2 | 132 |
| ◎45 | 100 | 0.9 | 0.4 | 0.4 | 0.8 | 0.9 | 0.15 | 0.08 | 1.7 | 35 | 31 | 35 | 2821 | 2021 | −15 | 176 |
| ◎46 | 100 | 0.7 | 0.4 | 0.4 | 1.2 | 0.7 | 0.15 | 0.08 | 1.5 | 27 | 46 | 27 | 2587 | 1821 | −12.3 | 112 |
| ◎48 | 100 | 0.9 | 0.4 | 0.4 | 1.3 | 0.8 | 0.15 | 0.08 | 1.7 | 30 | 43 | 27 | 2567 | 1821 | −14.7 | 167 |
| ◎49 | 100 | 0.8 | 0.4 | 0.4 | 1 | 1.1 | 0.15 | 0.08 | 1.6 | 28 | 34 | 38 | 2634 | 1765 | −13.3 | 134 |

Figure 2:
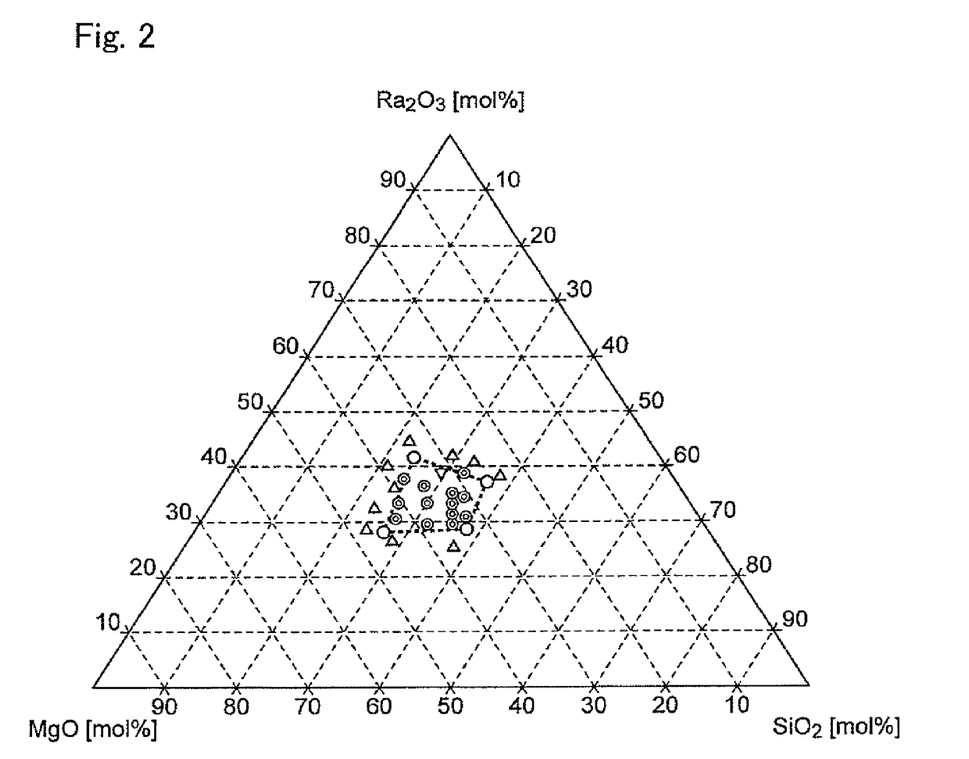
FIG. 2 is a triangular figure illustrating samples out of samples 1 to 40 according to Ex. 1, in which ranges of Ra oxide, Rb oxide, Rc oxide, Mg oxide and Si oxide are within the range of the present invention.

According to Table 1, in case when contents of Ra oxide, Rb oxide, Rc oxide, Mg oxide and Si oxide are within the range of the present invention, it was confirmed that a good highly accelerated life time can be obtained while satisfying X7R characteristic, and a high specific permittivity can be obtained. In addition, in case when a total amount RT of Ra oxide, Rb oxide and Rc oxide is 1.5 moles or more to 2.4 moles or less, and composition ratios of Ra oxide, Mg oxide and Si oxide are within a plane surrounded by a dotted line shown in FIG. 2, it was confirmed that a highly accelerated life time particularly improves, maintaining X7R characteristic FIG. 2 shows mole ratios of Ra oxide, Mg oxide and Si oxide of samples, out of sample numbers 1 to 40, in which contents of Ra oxide, Rb oxide, Rc oxide, Mg oxide and Si oxide are within the range of the present invention. A dotted line and peaks "o" shows a range surrounded by 4 points: point A (28, 34, 38), point B (37, 27, 37), point C (41, 35, 24), and point D (27, 46, 27). "◎" are samples within the range of the dotted line, wherein a total amount RT of Ra, Rb and Rc is 1.5 moles or more to 2.4 moles or less.

"Δ" are samples in which contents of Ra oxide, Rb oxide, Rc oxide, Mg oxide and Si oxide are within the range of the present invention; however their mole ratios of Ra oxide, Mg oxide and Si oxide are out of the range surrounded by the 4 points.

"∇" shows sample number 23 wherein mole ratios of Ra oxide, Mg oxide and Si oxide are out of the range surrounded by the 4 points; however, a total amount RT of Ra, Rb and Rc is 2.5 moles. This shows that the sample is out of the range: 1.5 moles or more to 2.4 moles or less.

Samples shown by "⊚", "Δ" and "∇" in FIG. 2 all showed preferable characteristics. Among all, it was confirmed that samples shown by "⊚" show particularly preferable characteristic by an over-all evaluation.

Further, with sample number 30, wherein the amount of Mg oxide relative to the amounts of Ra oxide and Si oxide is excessively included, and sample number 31, wherein an amount of Si oxide included is excessively small relative to the amounts of Ra oxide and Mg oxide, sintering was deficient by the firing condition of the invention, and the obtained dielectric layer part was poorly dense, and was not electrically connected. Accordingly, each measurement of the samples were not able to evaluate.

Samples of "⊚" in FIG. 1 showed that contents of Ra oxide, Rb oxide, Rc oxide, Mg oxide and Si oxide are within the range of the present invention, the mole ratios of Ra oxide, Mg oxide and Si oxide were within a range surrounded by the 4 points, and further, a total amount RT of Ra, Rb and Rc was within a range of 1.5 moles or more to 2.4 moles or less ("⊚" in FIG. 2). Samples indicating "✗" showed that contents of Ra oxide, Rb oxide, Rc oxide, Mg oxide and Si oxide were out of the range of the present invention. Unmarked samples showed that contents of Ra oxide, Rb oxide, Rc oxide, Mg oxide and Si oxide were with the range of the present invention; however, the mole ratios of Ra oxide, Mg oxide and Si oxide were out of the range surrounded by the 4 points ("Δ" in FIG. 2) or a total amount RT of Ra, Rb and Rc was out of the range of 1.5 moles or more to 2.4 moles or less ("∇" in FIG. 2).

Example 2

Samples of multilayer ceramic capacitors were manufactured as is the same method with Example 1, except contents of Ra, Rb and Rc were as shown in Table 2. Further, a composition of additive elements other than Ra, Rb and Rc was the same with Sample No. 19. Results are shown in Table 2.

TABLE 2

| Sample No. | Ra2O3 | Rb2O3 | Rc2O3 | Ra2O3 [mol] | Rb2O3 [mol] | Rc2O3 [mol] | Specific Permittivity [—] | CR Product [MΩμF] | Capacitance Changing Rate at 125° C. [%] | MTTF [h] |
|---|---|---|---|---|---|---|---|---|---|---|
| ⊚19 | Dy | Ho | Yb | | | | 2656 | 1985 | −13.8 | 163 |
| 50 | Gd | Ho | Yb | | | | 2835 | 2111 | −14.4 | 121 |
| 51 | Tb | Ho | Yb | | | | 2766 | 2099 | −14.9 | 156 |
| 52 | Dy | Y | Yb | | | | 2621 | 2010 | −13.8 | 135 |
| 53 | Dy | Y | Lu | | | | 2464 | 1978 | −13.2 | 119 |
| 54 | Tb | Y | Yb | | | | 2455 | 2278 | −15 | 131 |
| 55 | Gd | Y | Lu | | | | 2567 | 2333 | −14.7 | 103 |

According to Table 2, it was confirmed that the same effect can be obtained even when elements other than Dy, Ho and Yb were used as Ra, Rb and Rc, as long as contents are within a range of the present invention. In addition, samples of "⊚" in Table 2 used Dy as Ra, Ho as Rb and Yb as Rc. In this case, it was confirmed that lifetime, specific permittivity and CR product were particularly suitably obtained in a well balance.

Example 3

Samples of a multilayer ceramic capacitor were manufactured as is the same method with Example 1, except oxide elements of Ra, Rb and Rc were as shown in Table 3; and the same characteristic evaluations as with Example 1 were performed. In addition, a composition of additive elements other than Ra, Rb and Rc were the same with Sample 19. Results are shown in Table 3.

TABLE 3

| Sample No. | Ra2O3 | Rb2O3 | Rc2O3 | Ra2O3 [mol] | Rb2O3 [mol] | Rc2O3 [mol] | RT [mol] | Specific Permittivity [—] | CR Product [MΩμF] | Capacitance Changing Rate at 125° C. [%] | MTTF [h] |
|---|---|---|---|---|---|---|---|---|---|---|---|
| 19 | Dy | Ho | Yb | 0.8 | 0.4 | 0.4 | 1.6 | 2656 | 1985 | −13.8 | 163 |
| ✗56 | Dy | — | — | 1.6 | — | — | 1.6 | 2936 | 2342 | −18.3 | 96 |
| ✗57 | — | Ho | — | — | 1.6 | — | 1.6 | 2587 | 1746 | −13.3 | 43 |
| ✗58 | — | — | Yb | — | — | 1.6 | 1.6 | 2436 | 1221 | −9.8 | 24 |
| ✗59 | Dy | Ho | — | 0.8 | 0.8 | — | 1.6 | 2678 | 1876 | −16.8 | 123 |
| ✗60 | — | Ho | Yb | — | 0.8 | 0.8 | 1.6 | 2432 | 1109 | −13.7 | 37 |
| ✗61 | Dy | — | Yb | 0.8 | — | 0.8 | 1.6 | 2567 | 1567 | −12.6 | 21 |

Samples indicating "✗" are the samples comprising 2 kinds or less of rare-earth elements. In this case, it was confirmed that a desired characteristic cannot be obtained.

Example 4

Multilayer ceramic capacitor samples were manufactured as is the same method with Example 1, except contents of V oxide and Mn oxide were varied; and the same characteristic evaluations were performed with Example 1. Note that Cr₂O₃ instead of MnO was used in Sample 64; and WO₃ and MoO₃ instead of V₂O₅ were used in Samples 65 and 66 respectively. In addition, a composition of the other additive elements was the same with Sample 19. Results are shown in Table 4.

TABLE 4

| Sample No. | BaTiO3 [mol] | Ra2O3 [mol] | Rb2O3 [mol] | Rc2O3 [mol] | MgO [mol] | SiO2 [mol] | MnO [mol] | V2O5 [mol] | Specific Permittivity [—] | CR Product [MΩμF] | Capacitance Changing Rate at 125° C. [%] | MTTF [h] |
|---|---|---|---|---|---|---|---|---|---|---|---|---|
| 62 | 100 | 1.00 | 0.40 | 0.40 | 1 | 1 | 0.15 | 0.04 | 2549 | 1522 | −14.5 | 78 |
| ⊙63 | 100 | 1.00 | 0.40 | 0.40 | 1 | 1 | 0.15 | 0.05 | 2589 | 2567 | −13.7 | 109 |
| ⊙19 | 100 | 1.00 | 0.40 | 0.40 | 1 | 1 | 0.15 | 0.08 | 2656 | 1985 | −13.8 | 163 |
| ⊙64 | 100 | 1.00 | 0.40 | 0.40 | 1 | 1 | 0.15(Cr2O3) | 0.08 | 2588 | 1767 | −12.9 | 123 |
| ⊙65 | 100 | 1.00 | 0.40 | 0.40 | 1 | 1 | 0.15 | 0.08(WO3) | 2632 | 1721 | −14.5 | 115 |
| ⊙66 | 100 | 1.00 | 0.40 | 0.40 | 1 | 1 | 0.15 | 0.08(MoO3) | 2678 | 1654 | −13.9 | 132 |
| ⊙67 | 100 | 1.00 | 0.40 | 0.40 | 1 | 1 | 0.15 | 0.10 | 2644 | 1238 | −13.4 | 156 |
| 68 | 100 | 1.00 | 0.40 | 0.40 | 1 | 1 | 0.15 | 0.12 | 2631 | 654 | −12.9 | 167 |
| 69 | 100 | 1.00 | 0.40 | 0.40 | 1 | 1 | 0.05 | 0.08 | 2587 | 2378 | −14.5 | 56 |
| ⊙70 | 100 | 1.00 | 0.40 | 0.40 | 1 | 1 | 0.1 | 0.08 | 2466 | 2145 | −14.4 | 86 |
| ⊙71 | 100 | 1.00 | 0.40 | 0.40 | 1 | 1 | 0.2 | 0.08 | 2437 | 1385 | −13.8 | 151 |
| 72 | 100 | 1.00 | 0.40 | 0.40 | 1 | 1 | 0.3 | 0.08 | 2401 | 827 | −14 | 144 |

In Table 4, samples of "⊙" comprises 0.05 moles or more to 0.10 moles or less of an oxide of V(W, Mo) and an oxide of Mn(Cr). In this case, it was confirmed that CR product as well as a highly accelerated life time are particularly preferable.

Example 5

Samples of multilayer ceramic capacitor were manufactured as is the same method with Example 1, except an average particle diameter of barium titanate as a main component of the raw material was varied to 130 nm (sample number 73) and 250=(sample number 74). An average particle diameter thereof after sintering was measured. The same characteristic evaluations as in Example 1 were performed. In addition, a composition of various additive element was the same with sample 19. Results are shown in table 5.

In addition, Samples (Sample numbers 75a, 75, 76, 76a) of multilayer ceramic capacitor were manufactured as is the same method with Example 1, except an average particle diameter of barium titanate as a main component of the raw material was varied to 200 nm, and Ba/Ti ratios were varied as shown in Table 5. An average particle diameters thereof after sintering were measured. The same characteristic evaluations as in Example 1 were performed. In order to adjust Ba/Ti ratios after sintering as described in Table 5, the followings were performed. u/v in a raw material of barium titanate was made to 1.004, BaO was not added in sample number 75 and BaO was added separately with a main component in sample number 76. In addition, a composition of various additive elements was the same with sample number 19. Results are shown in Table 5.

According to table 5, in case when a particle diameter after sintering is small, a specific permittivity tends to decrease and a capacitance changing rate tends to deteriorate; however, a highly accelerated life time tends to be superior. In case when a particle diameter after sintering is large, a specific permittivity tends to become superior, while a highly accelerated life time tends to be inferior. Further, in case when Ba/Ti ratio is small, a specific permittivity tends to be inferior, and a firing stability tends to be deteriorated. In case when Ba/Ti ratio is large, CR product and a highly accelerated life time decreases, while a capacitance changing rate tends to be superior.

What is claimed is:

1. A dielectric ceramic composition comprising:
   a main component of a compound having a perovskite crystalline structure expressed by a general formula $ABO_3$, in which "A" is at least one selected from Ba, Ca and Sr and "B" is at least one selected from Ti and Zr, and
   sub components, with respect to 100 moles of the compound, of 0.6 moles or more to 1.4 moles or less of Ra oxide in terms of $Ra_2O_3$, in which Ra is at least one selected from a group consisting of Dy, Gd and Tb,
   0.2 moles or more to 0.7 moles or less of Rb oxide in terms of $Rb_2O_3$, in which Rb is at least one selected from a group consisting of Ho and Y,
   0.2 moles or more to 0.7 moles or less of Rc oxide in terms of $Rc_2O_3$, in which Rc is at least one selected from a group consisting of Yb and Lu,
   0.6 moles or more to 1.6 moles or less of Mg oxide in terms of Mg, and
   0.6 moles or more to less than 1.2 moles of Si included compound in terms of Si.

2. The dielectric ceramic composition as set forth in claim 1, wherein;

TABLE 5

| Sample No. | Average Particle Diameter of BaTiO3 [nm] | Particle Diameter after Sintering [nm] | Ba/Ti Ratio [—] | Specific Permittivity [—] | CR Product [MΩμF] | Capacitance Changing Rate at 125° C. [%] | MTTF [h] |
|---|---|---|---|---|---|---|---|
| 73 | 130 | 150 | 1.010 | 2212 | 2125 | −15.0 | 184 |
| 19 | 200 | 210 | 1.010 | 2656 | 1985 | −13.8 | 163 |
| 74 | 250 | 260 | 1.010 | 2789 | 1917 | −12.8 | 107 |
| 75a | 200 | 210 | 1.003 | 2745 | 2112 | −14.8 | 132 |
| 75 | 200 | 220 | 1.004 | 2732 | 2055 | −13.9 | 156 |
| 76 | 200 | 210 | 1.015 | 2532 | 1765 | −12.3 | 111 |
| 76a | 200 | 210 | 1.016 | 2324 | 1502 | −11.2 | 65 | a total amount of Ra oxide, Rb oxide and Rc oxide, in terms of $Ra_2O_3$, $Rb_2O_3$, $Rc_2O_3$ respectively, is 1.5 moles or more to 2.4 moles or less; and mole ratios of Ra oxide, Mg oxide and Si oxide are within a plane surrounded by 4 points of point A(28, 34, 38), point B(37, 27, 37), point C(41, 35, 24) and point D(27, 46, 27).

3. The dielectric ceramic composition as set forth in claim 1, further comprises 0.05 to 0.10 moles of at least one oxide selected from a group consisting of V, Mo and W, in terms of V, Mo and W, as the subcomponents.

4. The dielectric ceramic composition as set forth in claim 2, further comprises 0.05 to 0.10 moles of at least one oxide selected from a group consisting of V, Mo and W, in terms of V, Mo and W, as the subcomponents.

5. The dielectric ceramic composition as set forth in claim 1, further comprises 0.10 to 0.20 moles of Mn oxide and/or Cr oxide, in terms of Mn and/or Cr, as the subcomponents.

6. The dielectric ceramic composition as set forth in claim 2, further comprises 0.10 to 0.20 moles of Mn oxide and/or Cr oxide, in terms of Mn and/or Cr, as the subcomponents.

7. The dielectric ceramic composition as set forth in claim 1, wherein an average particle diameter after sintering is 150 to 260 nm.

8. The dielectric ceramic composition as set forth in claim 2, wherein an average particle diameter after sintering is 150 to 260 nm.

9. The dielectric ceramic composition as set forth in claim 1, wherein Ba/Ti=1.004 to 1.015.

10. The dielectric ceramic composition as set forth in claim 2, wherein Ba/Ti=1.004 to 1.015.

11. A ceramic electronic device comprising: a dielectric layer composed of the dielectric ceramic composition as set forth in claim 1, and an electrode layer.

12. A ceramic electronic device comprising: a dielectric layer composed of the dielectric ceramic composition as set forth in claim 2, and an electrode layer.

* * * * *